United States Patent [19]

Froeschke

[11] Patent Number: 5,766,642
[45] Date of Patent: Jun. 16, 1998

[54] APPARATUS FOR MANUFACTURING GRANULATED MATERIAL

[75] Inventor: Reinhard Froeschke, Weinstadt-Beutelsbach, Germany

[73] Assignee: Santrade Ltd., Lucerne, Switzerland

[21] Appl. No.: 446,617

[22] PCT Filed: Aug. 5, 1994

[86] PCT No.: PCT/EP94/02606

§ 371 Date: Jul. 17, 1995

§ 102(e) Date: Jul. 17, 1995

[87] PCT Pub. No.: WO95/09046

PCT Pub. Date: Apr. 6, 1995

[30] Foreign Application Priority Data

Sep. 28, 1993 [DE] Germany .................. 43 32 953.5

[51] Int. Cl.[6] ................................................ B29B 09/10
[52] U.S. Cl. ................ 425/6; 222/255; 222/415; 222/420; 264/8; 425/381; 425/382.3
[58] Field of Search .................. 222/415, 255, 222/420; 264/8; 425/131.5, 6, 381, 382.3, 131.1

[56] References Cited

U.S. PATENT DOCUMENTS

| | | | |
|---|---|---|---|
| 2,857,082 | 10/1958 | Perkins | 222/255 |
| 4,248,577 | 2/1981 | Bory et al. | 425/131.5 |
| 4,399,084 | 8/1983 | Sagawa | 425/8 |
| 4,559,000 | 12/1985 | Froeschke | 425/6 |
| 5,286,181 | 2/1994 | Schwager | 425/8 |

FOREIGN PATENT DOCUMENTS

| | | | |
|---|---|---|---|
| 0261537 | 12/1985 | Japan | 425/6 |
| 60-261537 | 12/1995 | Japan | 425/6 |

*Primary Examiner*—Jay H. Woo
*Assistant Examiner*—Iurie A. Schwartz
*Attorney, Agent, or Firm*—Burns, Doane, Swecker & Mathis, L.L.P.

[57] ABSTRACT

A mechanism for making granulated material from a viscous substance includes a vessel charged with the substance and having a discharge arrangement such as a slit through which the substance can flow onto a cooling surface. A belt disposed above the cooling surface is passed across the slit of the vessel. The belt has openings arranged to periodically come into alignment with the slit to allow the substance to flow therethrough. The belt is a thin metal belt strengthened by sleeves projecting from respective ones of the openings in a direction away from the vessel.

11 Claims, 2 Drawing Sheets

APPARATUS FOR MANUFACTURING GRANULATED MATERIAL

BACKGROUND OF THE INVENTION

The invention refers to an apparatus for manufacturing granulated material from free-flowing viscous substances that are made into drops and solidify or gel, consisting of a vessel, charged with the free-flowing substance, with an outflow slit which, for forming the drops, is intermittently opened or closed by a perforated belt that is periodically moved past them.

An apparatus of this kind is known from EP 0 134 944 B1, where an endless continuously recirculating belt is guided about two reversing pulleys, of which one at least is driven. The belt of this publication is made from a plastic material, for example PVC, in order to give the belt sufficient elasticity to permit its running about the pulleys and lying against the vessel. However, it is a characteristic feature of plastic belts that they wear and age relatively rapidly. This may lead to the need to provide for relatively frequent belt changes, causing production stoppages, or else, after longer periods of operation, the belt may no longer lie sufficiently close against the discharge slit of the vessel in which case its operation will deteriorate unless the belt is currently re-tensioned.

Now, it is the object of the invention to provide a belt that has a considerably longer service life and that does not offer the problems of elastically resilient belts.

SUMMARY OF THE INVENTION

The invention proceeds from the consideration that while metal belts, especially steel belts, would of course offer the desired belt properties, the relatively small dimensions of the reversing pulleys of the before-mentioned apparatuses and the flexibility necessitated thereby, would require the belts to be made very thin so that their openings would not have the necessary volumes to enable the desired drops to be formed. The invention now provides that, while the belt is configured as a thin metal belt, all its perforation openings are provided with sleeves protruding from its surface opposite the vessel. This configuration makes it possible to use a sufficiently thin steel belt that offers sufficient mechanical and aging stability while at the same time its openings have a sufficiently large volume for forming the drops.

According to an advantageous further development of the subject-matter of the invention, the sleeves may be provided with collars lying against the vessel surface of the metal belt, and the spaces between the collars and the sleeves may be filled up with a layer flush with the collars. The layer may consist, for example, of a plastic layer which then does not have to absorb any tension forces.

BRIEF DESCRIPTION OF THE DRAWINGS

The invention is depicted in the drawings with reference to exemplary embodiments, and will be explained below. In the drawings.

DETAILED DESCRIPTION OF PREFERRED EMBODIMENTS OF THE INVENTION

Figure 1:
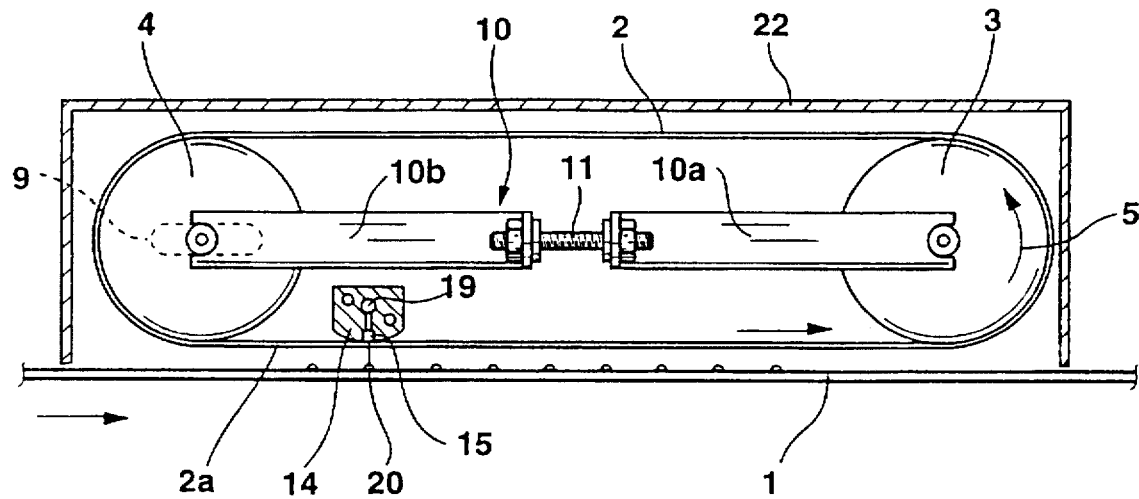
FIG. 1 shows a schematic vertical sectional view of an apparatus for manufacturing granulated material; according to the invention
Figure 2:
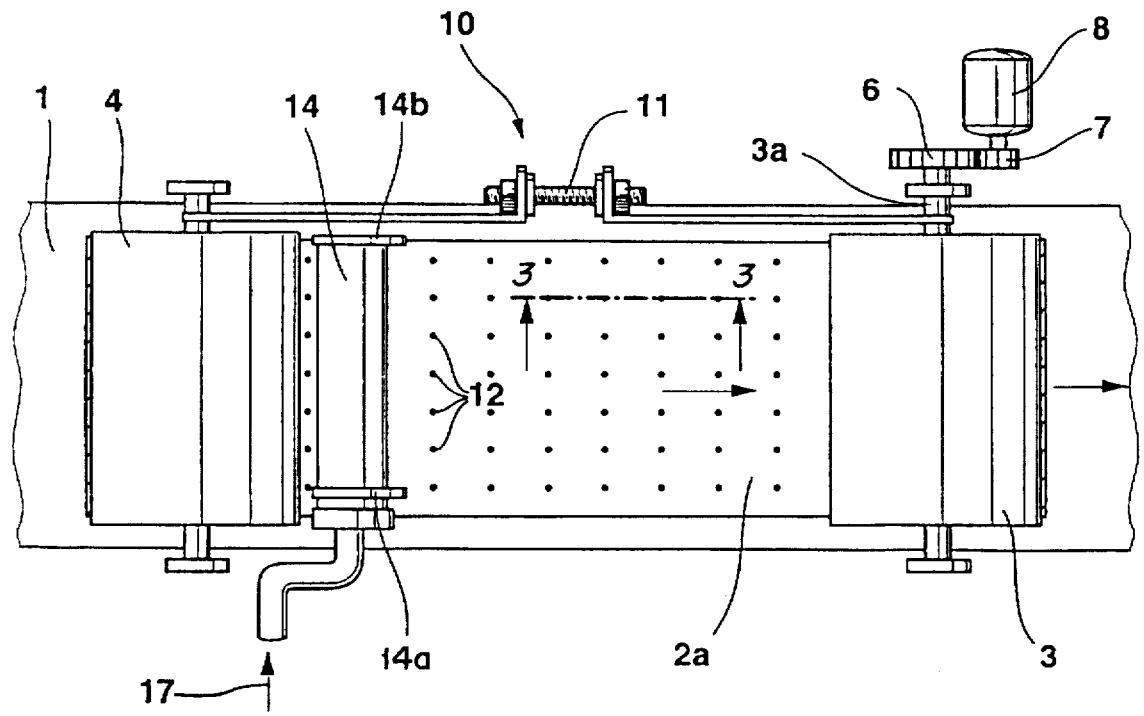
FIG. 2 shows a top view of the apparatus according to FIG. 1.

FIGS. 1 and 2 show an endless continuously recirculating belt (2) above a conveyor belt (1), especially a cooling belt designed as a steel belt, the belt (2) being guided about two reversing pulleys (3 and 4) that are mounted, in a manner not shown in detail, in a support frame (7) above the conveyor belt (1). The reversing pulley (3) is driven in the direction indicated by arrow (5). FIG. 2 shows that this is achieved by the fact that the supporting shaft (3a) of the reversing pulley (3) is provided with a gear (6) which latter is driven by an electric motor (8) via a pinion (7). However, it would of course also be possible to use a chain or belt drive, especially a V-belt drive.

The two reversing pulleys (3 and 4) are supported in such a way that their mutual distance can be adjusted within given limits. To this end, the reversing pulley (4) is retained in a longitudinal slot (9), indicated in broken lines in FIG. 1. The distance between the reversing pulleys (3 and 4) can be adjusted by means of a spacer consisting of the two parts (10a and 10b) and being provided with a screw bolt (11). Spacers of this type are provided on both sides of the reversing pulleys.

Figure 3:
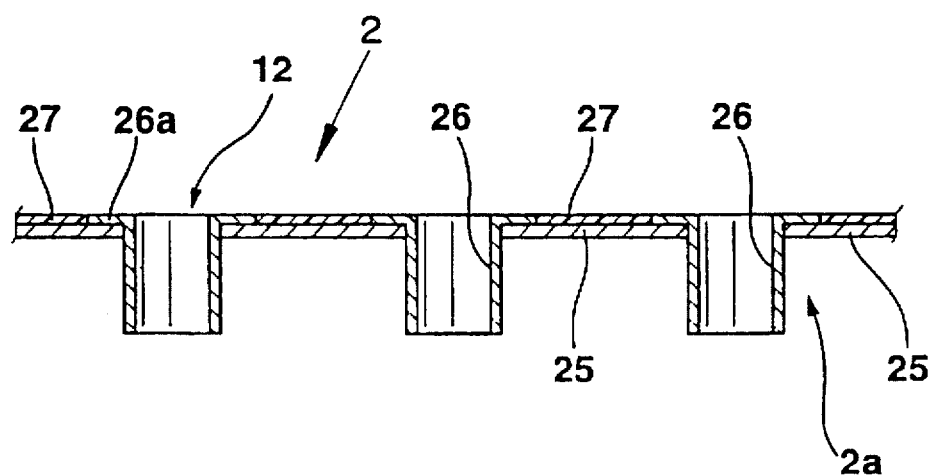
FIG. 3 shows an enlarged section through the perforated belt used in the apparatus according to FIGS. 1 and 2, taken along line 3—3 in FIG. 2.

The continuously recirculating belt (2)—only a section of the lower run (2a) is shown in FIG. 3—consists of a perforated metal belt, especially a steel belt (25) having a very small thickness—as can be seen in FIG. 3. Consequently, this thin steel belt (25) can be mounted and guided on the reversing pulleys (3 and 4) even in the presence of small dimensions.

The perforations (12) provided in the steel belt (25), which in the illustrated embodiment are circular in shape—are each provided with an inserted sleeve (26) that has its collar (26a) in contact with, and for example connected by welding to, a surface of the steel belt (25) which faces a tabular body (14) during circulation of the steel belt (2). The free spaces remaining between the collars (26a) of the sleeves (26) are filled up with a layer (27), especially a layer of a plastic material, so that the inner surface of the belt (2) exhibits a smooth surface.

As can be seen in FIG. 1, the steel belt (2) is in contact with the curved outer surface of the tubular body (14) that is provided, on its outer surface facing the lower run (2a) of the belt, with a slit (15) that extends transversely to the belt (2) and that is either closed by the perforated belt (2) lying closely against it, or released every time it is passed by a row of openings (12).

The tubular body (14) comprises a guide channel (19) for a viscous and free-flowing compound that is supplied in free-flowing, especially heated, condition in the direction indicated by arrow (17). Openings extending from this guide channel (19) open into the slit (15) that is configured as an open groove. If, therefore, the supply channel (19) is charged with the material to be formed into drops, the latter may drop into the slit (15) and from there through the sleeves (26) and onto the conveyer belt formed by the cooling belt (1). This is possible in spite of the relative thinness of the steel strip or belt (25) because the sleeves (26) provide volumes sufficient to accommodate a given quantity of the—in the present example hot—compound arriving from the tubular body (14) and to dispense it in drop form onto the surface of the cooling belt (1) where the compound solidifies in the form of small lentil-shaped bodies.

In order to maintain the temperature of the compound to be formed into drops stable throughout the apparatus, the tubular body (14) is heated in a manner not shown in detail. In addition, the whole apparatus is closed by a cover hood (22). Directing devices (14b) in the form of radially projecting ribs serve to urge the product, that emerges from the tubular body, back upon the inner belt surface with its openings (12).

Figure 4:
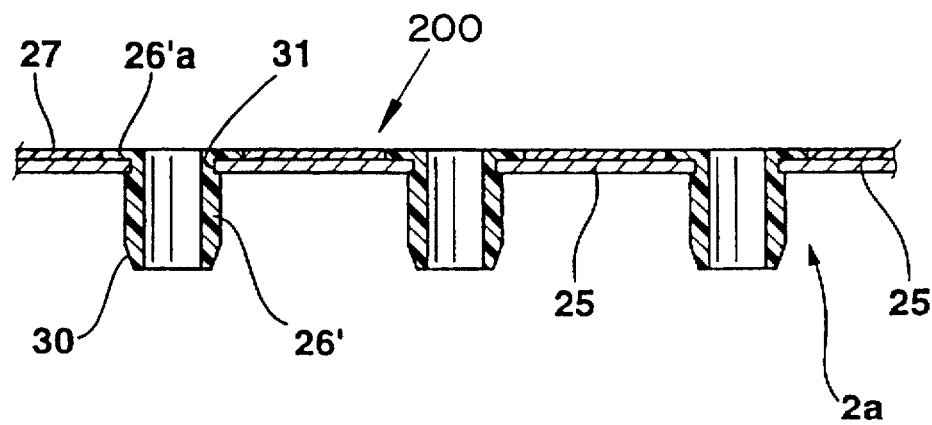
FIG. 4 shows a view of a variant of the perforated belt similar to the view of FIG. 3.

FIG. 4 shows a variant of the perforated belt (200) which is provided with inserted sleeves (26') in the same manner as in the embodiment shown first, whereas the sleeves are designed in this case as nozzles made from an elastically deformable material. The sleeves (26') comprise an insertion bevel (30) on one end, and an all-around locking groove (31) provided in the area of its other end, that serve for positively retaining the steel belt (25) of the belt (200). The material of the sleeves (26') being elastic, as for example a plastic material, the insertion bevels (30) of the sleeves (26') can be pressed into the openings of the steel belt (25) so that their locking grooves (31) get locked in the openings. Just as in the case of the before-mentioned embodiment, the layer (27) provides again a smooth contact surface on the side of the collar (26'a).

I claim:

1. Apparatus for manufacturing granulated material from a free-flowing viscous substance that is made into drops which solidify or gel, comprising:

a vessel charged with the free-flowing substance and having a discharge opening arrangement;

a pair of rotatable pulleys disposed on opposite side of the vessel;

a belt perforated with openings, the belt extending around the pulleys, a portion of the belt disposed between the pulleys being arranged to move across the discharge opening arrangement so that to move the openings of the belt periodically come into alignment therewith to open the discharge opening arrangement and permit the free-flowing substance to flow therethrough, the belt comprising a thin metal strip having said openings formed therethrough, and sleeves protruding from respective ones of the openings in a direction away from the vessel.

2. The apparatus according to claim 1, wherein each sleeve is provided with a collar lying against a surface of the strip which faces the vessel, spaces on that surface disposed between the collars being filled with a layer of material, the layer being flush with the collars.

3. The apparatus according to claim 2, wherein the material of the layer is plastic.

4. The apparatus according to claim 1, wherein the sleeves are positively held on the strip.

5. The apparatus according to claim 4, wherein the sleeves are welded to the strip.

6. The apparatus according to claim 4, wherein the sleeves are formed of plastic.

7. The apparatus according to claim 6, wherein each of the sleeves includes a locking groove locked in a respective opening.

8. The apparatus according to claim 7, wherein an end of each sleeve disposed opposite the collar is beveled.

9. A perforated belt for use in the manufacture of granulated material from a free-flowing viscous substance, the belt comprising a metal strip having openings extending therethrough and sleeves protruding from respective ones of the openings.

10. The perforated belt according to claim 9, wherein each sleeve is provided with a collar lying against a first side of the strip, spaces on that side disposed between the collars being filled with a layer of material which lies flush with the collars, the sleeves projecting from a second side of the strip.

11. The perforated belt according to claim 10, wherein the material is plastic.

* * * * *